(12) United States Patent
Sen et al.

(10) Patent No.: US 8,176,495 B2
(45) Date of Patent: May 8, 2012

(54) CLIENT AFFINITY IN DISTRIBUTED LOAD BALANCING SYSTEMS

(75) Inventors: Siddhartha Sen, Bellevue, WA (US); Vladimir Petter, Bellevue, WA (US); Andrea D'Amato, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1153 days.

(21) Appl. No.: 11/856,044

(22) Filed: Sep. 16, 2007

(65) Prior Publication Data

US 2009/0077562 A1    Mar. 19, 2009

(51) Int. Cl.
*G06F 15/00* (2006.01)

(52) U.S. Cl. ........................................ 718/105

(58) Field of Classification Search ................ None
See application file for complete search history.

(56) References Cited

U.S. PATENT DOCUMENTS

| | | | |
|---|---|---|---|
| 6,006,259 A | 12/1999 | Adelman et al. | |
| 6,587,866 B1 * | 7/2003 | Modi et al. | 718/105 |
| 6,671,259 B1 | 12/2003 | He et al. | |
| 6,691,165 B1 | 2/2004 | Bruck et al. | |
| 6,735,205 B1 | 5/2004 | Mankude et al. | |
| 7,003,574 B1 * | 2/2006 | Bahl | 709/228 |
| 7,209,977 B2 | 4/2007 | Acharya et al. | |
| 2001/0052024 A1 | 12/2001 | Devarakonda et al. | |
| 2002/0010783 A1 | 1/2002 | Primak et al. | |
| 2002/0107962 A1 | 8/2002 | Richter et al. | |
| 2002/0143965 A1 | 10/2002 | Aiken, Jr. | |
| 2003/0065711 A1 * | 4/2003 | Acharya et al. | 709/203 |
| 2004/0267920 A1 | 12/2004 | Hydrie et al. | |
| 2005/0005006 A1 | 1/2005 | Chauffour et al. | |
| 2006/0130064 A1 | 6/2006 | Srivastava | |

FOREIGN PATENT DOCUMENTS

EP    1117227 A1    7/2001

OTHER PUBLICATIONS

International Search Report and Written Opinion Received for PCT Application No. PCT/US2008/076271, mailed on Apr. 20, 2009, 11 pages.
Aversa, et al., "Load Balancing a Cluster of Web Servers", Boston University, pp. 13.
"How Network Load Balancing Works", 2007, Microsoft, pp. 1-2.
Dragos, et al., "Design and Implementation of an MPLS Based Load Balancing Architecture for Web Switching" Dublin City University, pp. 9.

* cited by examiner

*Primary Examiner* — Corey S Faherty (57) ABSTRACT

Aspects of the subject matter described herein relate to client affinity in distributed load balancing systems. In aspects, a request from a requester is sent to each server of a cluster. Each server determines whether it has affinity to the requester. If so, the server responds to the request. Otherwise, if the request would normally be load balanced to the server, the server queries the other servers in the cluster to determine whether any of them have affinity to the requester. If one of them does, the server drops the request and allows the other server to respond to the request; otherwise, the server responds to the request.

18 Claims, 6 Drawing Sheets

CLIENT AFFINITY IN DISTRIBUTED LOAD BALANCING SYSTEMS

BACKGROUND

When the workload of a server becomes such that the server is unable to perform the work in a timely manner, the workload may be distributed among multiple servers. Spreading the workload among multiple devices is sometimes referred to as load balancing. Sometimes, load balancing is performed by having a single device receive all requests and determine which server to send the request to. In other load balancing mechanisms, the request may be sent to all of the servers and each server determines whether it should service the request. Other load balancing mechanisms will be apparent to those skilled in the art.

For some applications, it is desirable that communications from the same client go to the same server. This is sometimes called client affinity or simply affinity. For example, if a server is storing shopping cart information related to a client's order and a request from the client is then serviced by another server, the shopping cart information and/or session state may not be available to the other server. Client affinity becomes more complicated in load balanced systems.

SUMMARY

Briefly, aspects of the subject matter described herein relate to client affinity in distributed load balancing systems. In aspects, a request from a requester is sent to each server of a cluster. Each server determines whether it has affinity to the requester. If so, the server responds to the request. Otherwise, if the request would normally be load balanced to the server, the server queries the other servers in the cluster to determine whether any of them have affinity to the requester. If one of them does, the server drops the request and allows the other server to respond to the request; otherwise, the server responds to the request.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
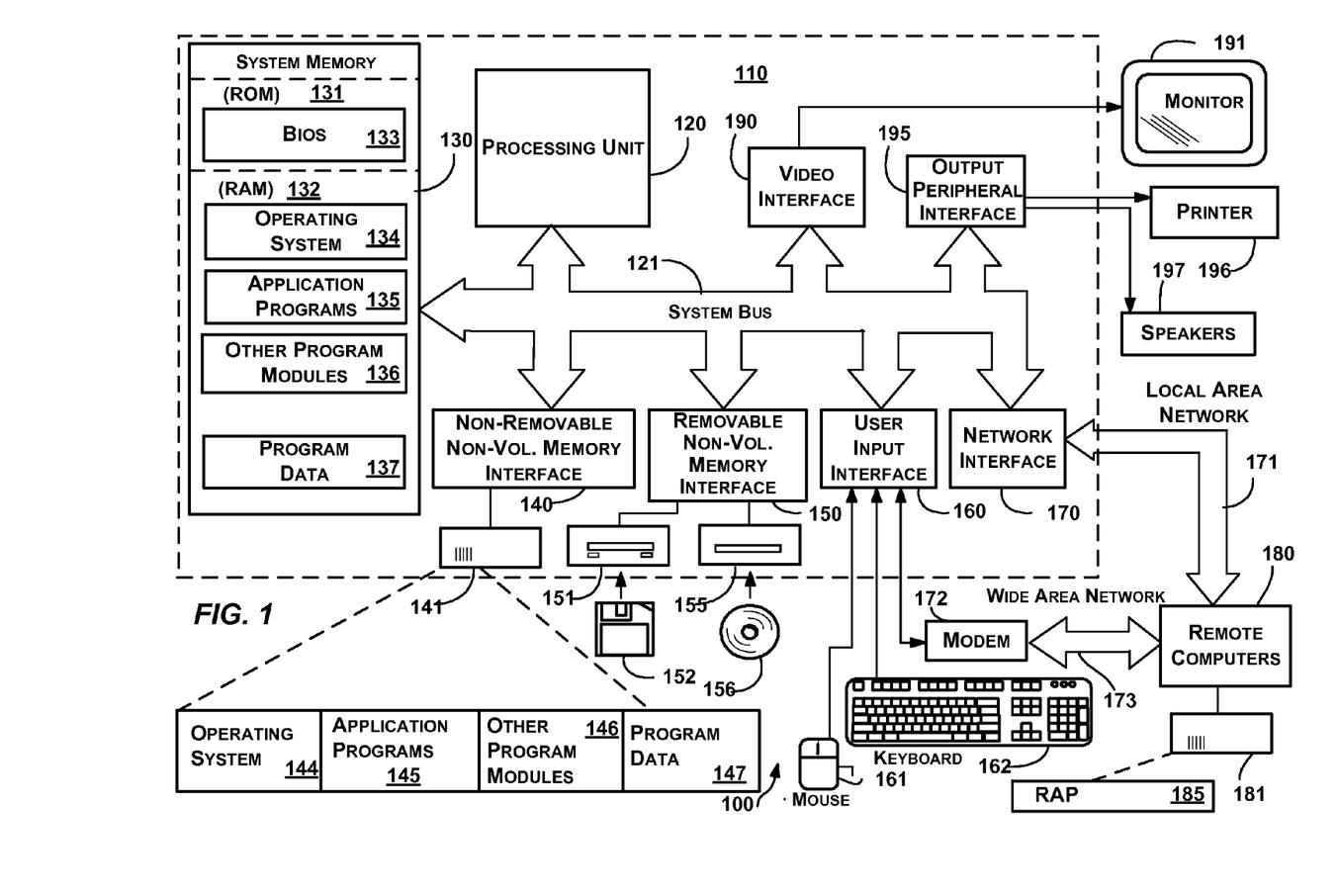
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Client Affinity

As mentioned previously, load balancing may be performed by sending a request to each server of a cluster and allowing each server to determine whether it will service the request. To send a request to each server, incoming packets may be flooded (e.g., by a switch) to the servers. The server that determines that it is supposed to respond to the packet may respond while the other servers may drop the packets. To have client affinity across connections, however, may involve additional actions as described below.

Figure 2:
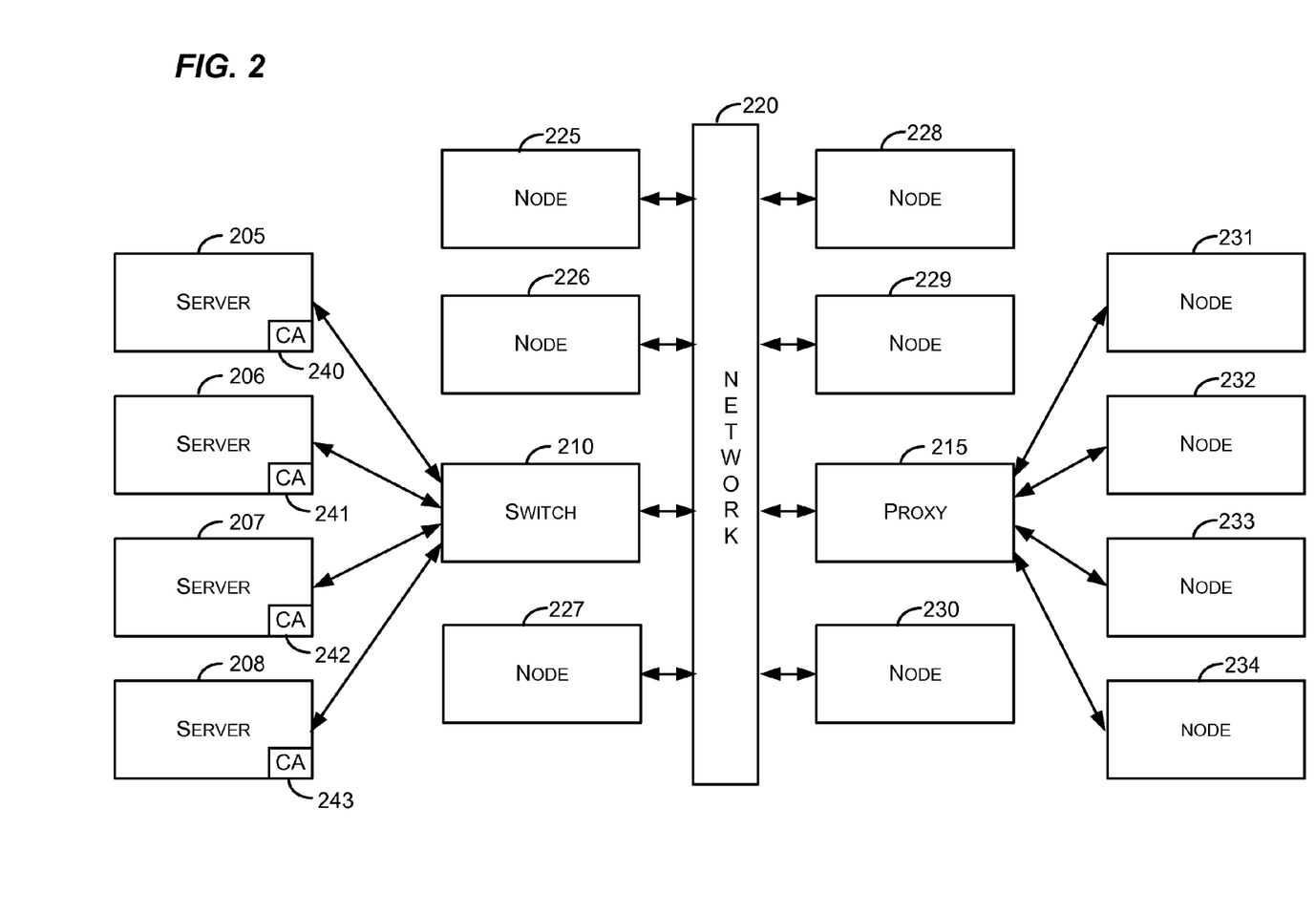
FIG. 2 is a block diagram that generally represents an exemplary networking environment in which aspects of the subject matter may be implemented.

FIG. 2 is a block diagram that generally represents an exemplary networking environment in which aspects of the subject matter may be implemented. The environment may include servers 205-208, a switch 210, a proxy device 215, a network 220, nodes 225-235, and may include other entities (not shown). The various entities may communicate with each other via various networks including intra- and inter-office networks and the network 220. In an embodiment, the network 220 may comprise the Internet. In an embodiment, the network 220 may comprise one or more private networks, virtual private networks, and the like. The servers 205-208 may include client affinity components 240-243, respectively, as described in more detail in conjunction with FIG. 3.

In one embodiment, each of the entities 205-208, 210, 215, and 225-234 may be implemented on or as one or more computers (e.g., the computer 110 as described in conjunction with FIG. 1). The nodes 225-230 may connect to the network via a modem (e.g., cable, DSL, phone, and the like) while the nodes 231-234 may comprise workstations at a company or elsewhere that access servers such as the servers 205-208 via the proxy device 215. A node is sometimes referred to herein as a requester.

The proxy device 215 may translate internal network addresses including IP and port numbers to external network addresses and may make requests on behalf of the nodes 231-234. For example, a company may have a set of dynamic or static IP addresses with which it may access the network 220. The proxy device 215 may store translations between internal network addresses and external addresses in a table or the like. When the proxy device 215 receives a response to a request, the proxy device 215 may look up the node that sent the request using the destination address as an index into the table. The proxy device 215 may then send the response to the node.

The switch 210 may be configured to flood packets received from the network 220 to all of the servers 205-208. In this way, each of the servers 205-208 is able to examine each packet sent from the network 220 and determine whether it should respond to the packet. In one embodiment, the switch 210 may be a dedicated hardware device. In another embodiment, the switch may be part of a router or other higher-layer device configured to direct packets between the network 220 and the servers 205-208. There may be devices (not shown) between the switch 210 and the network 220 that assist in sending packets to and from the network 220.

The servers 205-208 may include components configured to load balance requests. These components may include or be part of the client affinity components 240-243. These components may execute on each of the servers 205-208 such that when a new connection request is received, each server determines whether it should service the request.

A group of servers, such as the servers 205-208, that are configured to service requests in a load balancing environment are sometimes referred to as a cluster. In a cluster, servers may get shut down, removed from the cluster, become inoperable, or fail. Servers may also be added to the cluster. When one or more servers are removed and/or added, this is sometimes referred to a changing the membership of the cluster.

In a distributed, stateless cluster, each incoming packet may be flooded to every cluster server. Each server may be assigned a portion of the total incoming requests. A server's portion of the workload is sometimes called its load quanta. For a new incoming request, a server may determine whether the request maps to the server's load quanta by inspecting the contents of the packet.

In one embodiment, the source and/or destination information in the packet may be used to determine whether the request maps to the server's load quanta. For example, one set of IP addresses may map to one server's load quanta while another set of IP address may map to another server's load quanta. In one embodiment, determining which quanta the request maps to may be determined by applying a hash on the source address. In another embodiment, determining which quanta the request maps to may be determined by doing a lookup that associates a source address with a load quanta. In yet other embodiments, determining which quanta the requests maps to may be determined by hashing on multiple addresses in the request. Indeed, many different ways may be used to determine which quanta a request maps to without departing from the spirit or scope of aspects of the subject matter described herein.

When a server is removed from the cluster, the load quantas assigned to the remaining servers may be adjusted. Similarly, when a server is added to the cluster, the load quantas may again be adjusted so that the new server is given part of the workload. The load quanta may be adjusted for other reasons including that a server has too much work to service in a timely manner.

In part, it is the possibility of these changing quantas that poses a challenge to client affinity in stateless, distributed load balancing clusters. For example, before changing a quanta, a source network address may map to a quanta associated with a first server. After the quanta is changed, however, the same source network address may map to a quanta associated with another server. If the quanta is all that is used to direct packets, this may be a problem if this happens while a requesting node has established some state with the first server. For example, if the requesting node is filling a shopping cart on the first server and the first server's quanta no longer includes the requesting node's address, the server that now includes the quanta that includes the requesting node will not have the shopping cart information.

The shopping cart example is but one example of a communication that may fail if the quanta changes. Aspects of the subject matter described herein are not intended to be applied only to this example, but indeed may be applied in many different scenarios where maintaining the client affinity across connections is desired.

Although the term connection is sometimes used herein, aspects of the subject matter may also be applied to sessions in a similar manner as they are applied to connections. Where the term connection is used herein, in one embodiment it is to be replaced with the word session. In another embodiment it is to remain as is.

Furthermore, although client affinity is sometimes referred to herein as affinity to a particular source address, client affinity may also refer to protocol affinity where requests from a particular client or group of clients using a particular protocol have affinity with one or more servers.

To provide client affinity, each server in a cluster may maintain an affinity table. In one embodiment, when the servers receive a new request, each server may first check its client affinity table. The server may use the source IP address of the request as an index into the table. If the table indicates that the server has an affinity to that client, the server may respond. If the table indicates that the server does not have an affinity to the client, then the server may first determine whether the request would be part of the server's load quanta. If not, the server may drop the packet. If the request would be part of the server's load quanta, the server may first broadcast to the other servers of the cluster and ask if any server has affinity to the client. If no server responds (or does not respond in a timely manner), the server may assume that no other server has affinity to the client and may then service the request.

If a server responds, the server may update an exception list that indicates clients that are in the server's quanta but have affinity with other servers. In one embodiment, the exception list is dynamic and is updated as affinity information is received from other servers, in response to timeout periods, when connections are terminated, and the like.

Exception list information may be transferred in compressed or uncompressed form without departing from the spirit or scope of aspects of the subject matter described herein. In one embodiment, a hash or a bloom filter of an exception list may be sent. A server having a bloom filter of an exception list may request additional affinity information if it is unsure whether a requester has affinity with another server.

In another embodiment, when a server is asked if it has affinity to a particular requester, the server may respond with additional affinity information the server may have. For example, if a server is asked if it has affinity to requester X, the server may respond indicating that the server has affinity to requesters 1 . . . N where the amount of the affinity information passed (which corresponds to N) is selectable and where the affinity information may or may not include X. This may be done, for example, to reduce subsequent requests for affinity information.

In another embodiment, a server that has affinity to a requester may send a message to the server that has the load quanta for the requester. This may be done in lieu of having the server that has quanta for the requester querying for a server that has affinity to the requester. If the server that has quanta for the requester does not receive a message from one of the other servers within a configurable period of time, the server that has quanta may assume that no other server has affinity to the requester and may service the requester accordingly.

In another embodiment, when a request is received by servers, first each server determines whether the request would map to the server's quanta. If the packet does not map to the server's quanta, the server checks to see if it has prior affinity to the source address included in the request. If prior affinity exists, the server handles the request. If prior affinity does not exist, the packet that includes the request is dropped.

If the request maps to a server's quanta, first the server checks to see if the server has a prior affinity with the source address included in the request. If prior affinity exists, the server handles the request. If no information is found, the server broadcasts to other nodes to determine whether any of them have affinity to the source address. If so, the server drops the packet including the request and adds an entry in a data structure to indicate that another server has affinity with the requester. Otherwise, the server accepts the request and adds an entry to the server's affinity table.

Although the environment described above includes four servers, ten nodes, and various other entities in various configurations, it will be recognized that more, fewer, and/or a different combination of these and other entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
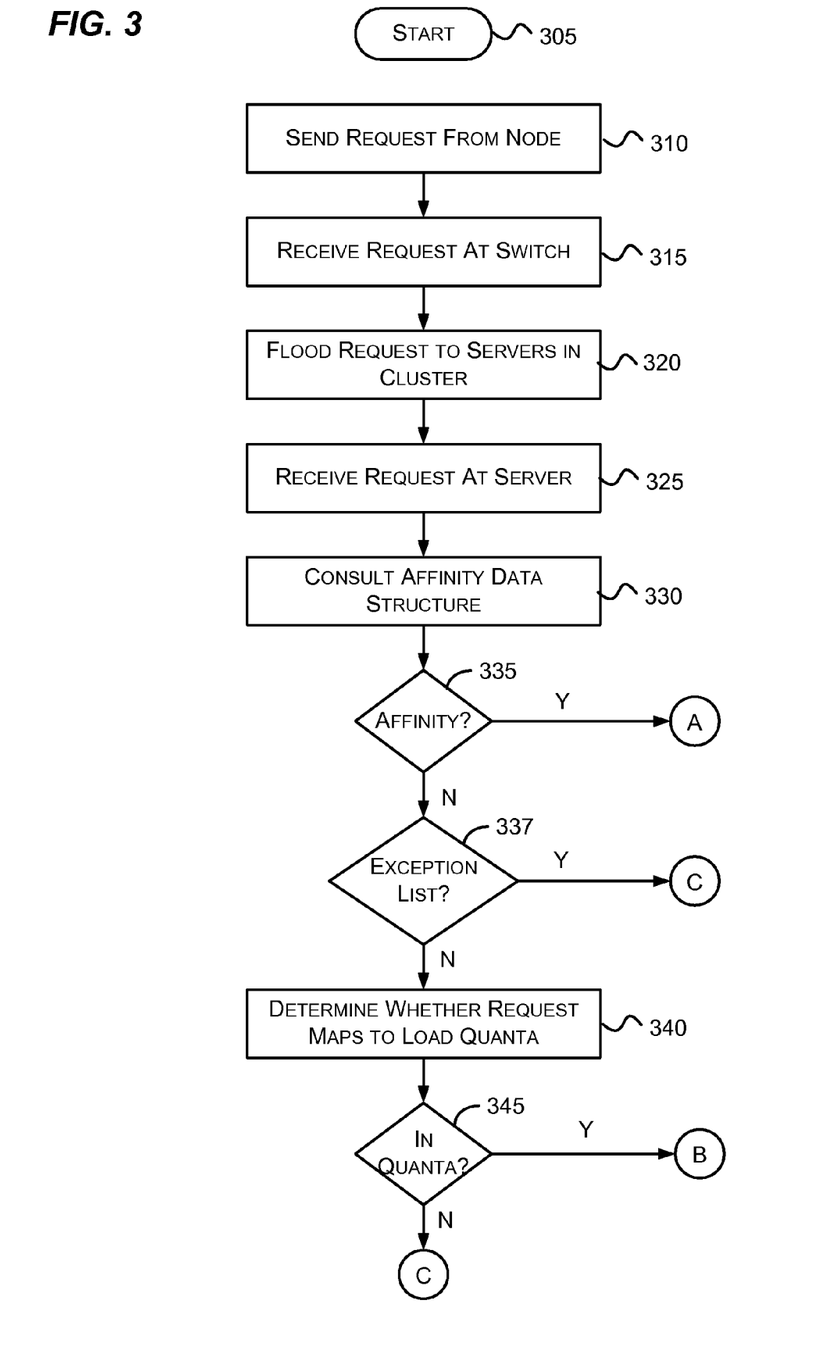
FIGS. 3-5 are flow diagrams that generally represent exemplary actions that may occur in maintaining and using client affinity in accordance with aspects of the subject matter described herein.
Figure 4:
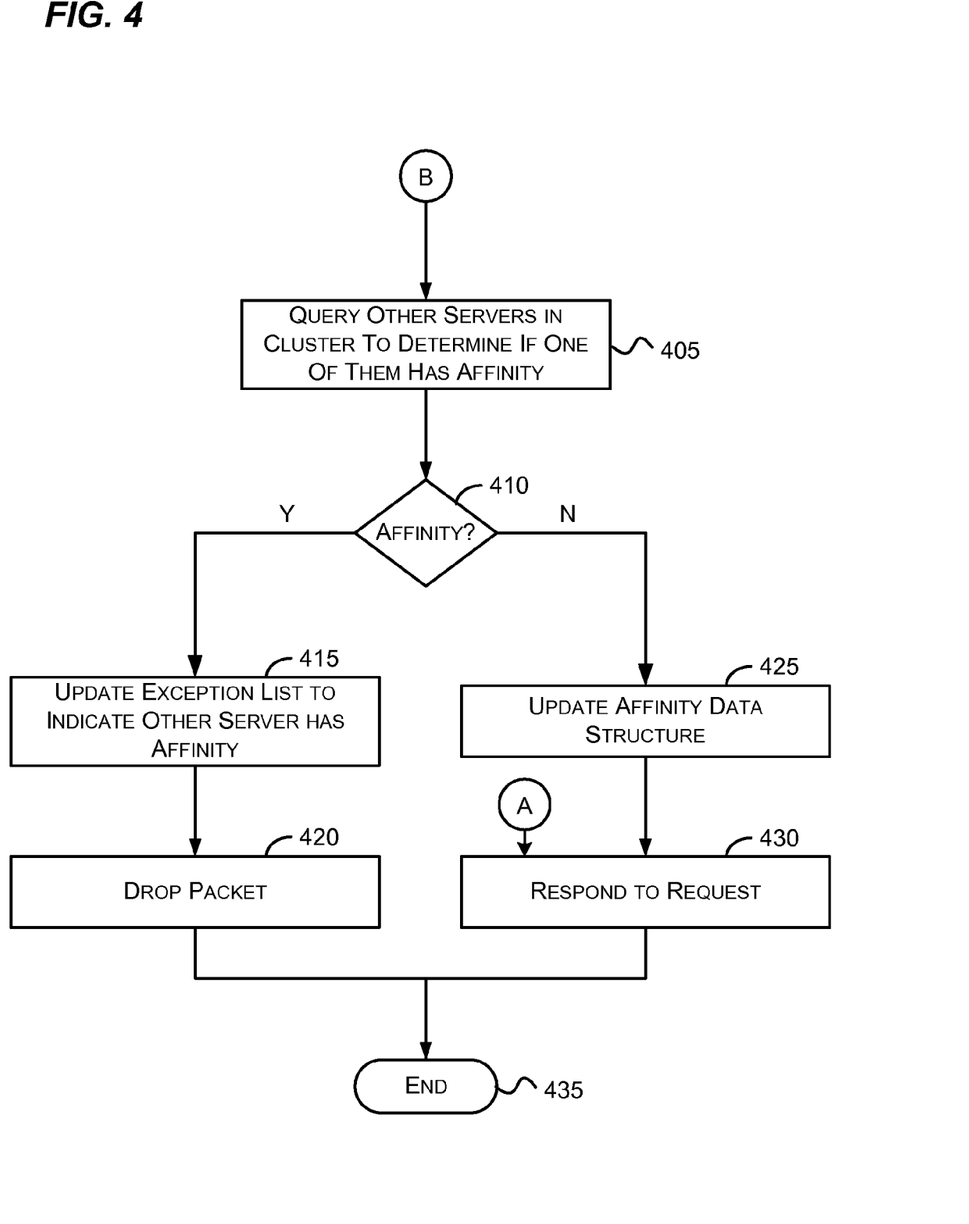
Figure 5:
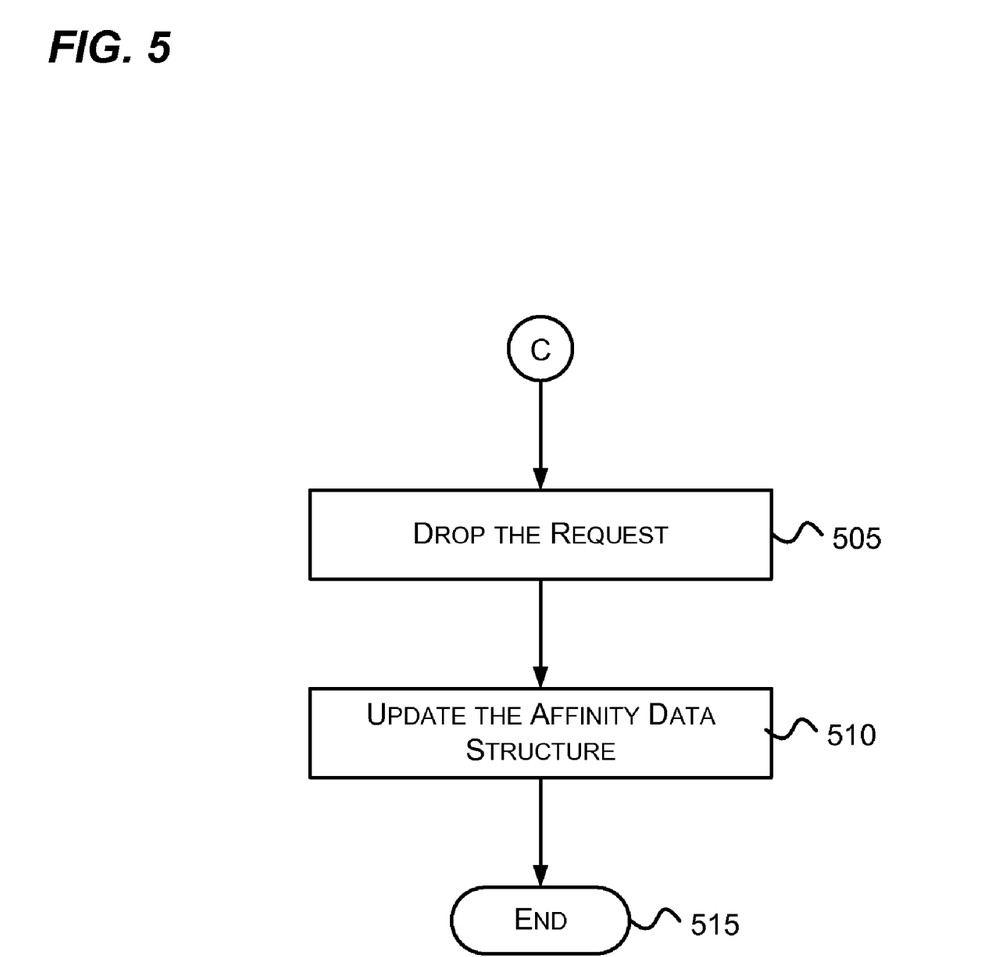

FIGS. 3-5 are flow diagrams that generally represent exemplary actions that may occur in maintaining and using client affinity in accordance with aspects of the subject matter described herein. For simplicity of explanation, the methodology described in conjunction with FIGS. 3-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 3, at block 305, the actions begin.

At block 310, a node (e.g., a requester) sends a request. For example, the request may be a request to open a connection so that the node can request a service from one of servers of the cluster. For example, referring to FIG. 2, the node 228 may send a packet (e.g., a TCP SYN) to open a connection. The request may include a source address and a destination address. In Transmission Control Protocol/Internet Protocol (TCP/IP) and some other protocols, the source address may include two parts: a source address and a source port address. The destination address may also include these two parts.

Note that although TCP/IP is mentioned in one embodiment for illustrative purposes, in other embodiments, other protocols may be used. In general, any network protocol that includes an address that may be used to respond to the requester may be used without departing from the spirit or scope of aspects of the subject matter described herein.

At block 315, the request is received at a switch or other networking device. In packet-switched networks such as TCP/IP networks, requests may be placed in packets that are transported via the network. For example referring to FIG. 2, a packet that includes the request of the node 228 is received by the switch 210.

At block 320, the request is flooded to the servers in the cluster. For example, referring to FIG. 2, the switch 210 broadcasts the received packet to the servers 205-208.

At block 325, each server receives the request. For example, referring to FIG. 2, each of the servers 205-208 receives the packet.

At block 330, each server consults its affinity data structure to determine whether the server has affinity to the requester sending the request. In one embodiment, an affinity data structure may include multiple entries (e.g., rows) that indicate requesters for which the server has affinity. The affinity data structure may also include an exception list that includes entries that indicate requesters for which the server knows that other servers have affinity. In one embodiment, the affinity data structure may indicate requesters for which the server has affinity and requesters for which the server knows other servers have affinity.

In addition, the affinity data structure may indicate how long the information in each entry is valid. This may take the form of the time that a communication from the requester was last received, a time to live field, and many other forms without departing from the spirit or scope of aspects of the subject matter described herein.

At block 335, if the server has affinity to the requester, the actions continue at block 430 of FIG. 4; otherwise, the actions continue at block 337.

At block 337, a determination is made as to whether the requester has affinity with another server by checking the exception list. If so, the actions continue at block 505 of FIG. 5; otherwise, the actions continue at block 340.

At block 340, a determination is made as to whether the request maps to the server's load quanta. For example, referring to FIG. 2, each of the servers (e.g., servers 206-208) that do not have affinity with the requester may determine whether a request maps to the server's load quanta.

At block 345, if the request maps to the server's load quanta, the actions continue at block 350; otherwise, the actions continue at block 505 of FIG. 5.

Turning to FIG. 4, at block 405, the server having the load quanta to which the request maps queries the other servers in the cluster to determine if one of them has affinity to the requester. For example, referring to FIG. 2, if the server 205 has the load quanta to which the request from the node 228 maps, the server 205 queries the other servers to determine if any of them has affinity of the requester.

While the server is querying the other servers, the request may be queued on the server. While it is queued, the request is not responded to by the server. In addition, while a request is queued, the server may perform other actions.

Note that in another embodiment, the server may not send a query to the other servers. Instead, as mentioned previously, the server may wait for a period of time for another server to indicate that the other server has affinity to the requester. If the server does not receive a message from another server for a period of time, the server may assume that no other server has affinity.

At block 410, if one of the other servers responds and indicates that it has affinity to the requester, the actions continue at block 415; otherwise, the actions continue at block 425. Note that there may be a timeout period for receiving responses from the other servers. In one embodiment, if a server does not respond within the timeout period, the server having the load quanta to which the request maps may assume that there are no other servers having affinity to the requester. This timeout period may be used to avoid a situation in which a server having affinity becomes inoperable, for example.

In another embodiment, if there is no response from one or more servers within the timeout period, the server may initiate a group membership change. In the group membership change, the cluster membership may be verified and load quanta may be assigned differently.

In yet another embodiment, if there is no response from one or more servers within the timeout, the server may retry a selected number of times before assuming that the one or more servers are no longer functioning.

At block 415, the server having the load quanta that maps to the request updates an exception list (which may be part of the affinity data structure) to indicate that another server has affinity to the requester. For example, if the server 206 responds to the query of block 405 and indicates that it has affinity to the node 228, the server 205 may indicate this by updating an exception list. This exception list may be aged as described in more detail below.

At block 420, the server having the load quanta that maps to the request drops the packet as the server having affinity to the requester is the server that is supposed to respond to the request. For example, referring to FIG. 2, the server 205 drops the packet.

Note that even though a server that has the load quanta to which the request maps queries the other servers, if another server has affinity to the requester, this does not delay the other server from responding to the request as that other server could have responded immediately after determining that it had affinity to the requester.

At block 425, the affinity data structure is updated to indicate that the server having the load quanta to which the request maps now has affinity to the requester. For example, referring to FIG. 2, if no other servers had affinity to the requester and the server 205 had the load quanta to which the request maps, the server 205 would accept the request and update its affinity data structure to indicate that the server 205 has affinity with the requester.

At block 430, the server responds to the request. For example, the server may send a TCP SYN-ACK response to indicate that the requester may establish a connection with the server. For example, referring to FIG. 2, the server 205 sends a response packet to the requester (e.g., node 228).

Turning to FIG. 5, if a server does not have affinity to the requester and the server does not have the load quanta associated with the requester, the server drops the request at block 505. Dropping the request refers to not responding to the request and may include removing the packet corresponding to the request from a queue on the server. For example, if server 205 receives a request and determines that it does not have affinity to the requester and also does not have a load quanta associated with the requester, the server 205 may simply drop the packet.

Even though the server has dropped the request, the server may be able to update information maintained in its affinity data structure. For example, the server may update a field that indicates the last time a request was received from the client. This may be used, for example, to age the affinity entry so that it may be removed after a period of inactivity. At block 510, the affinity data structure is updated.

At block 515, the actions end.

In some embodiments, the load balancing system may include mechanism that ensure that after a connection has been established with a server that the same server responds to each request for a single connection. For example, each server may maintain enough state about connections that it is servicing so that when additional communications come through the connection, the server knows that it is to respond to that communication. In such embodiments, the actions described above with respect to FIGS. 3-5 may only occur each time a new connection request is received. When the request is part of a current connection, the mechanism above may be used to ensure that the request is serviced by the appropriate server.

In other embodiments, however, affinity information may be used in addition to or in lieu of that provided by a load balancing system to ensure that the same server responds to each request on a single connection. For example, after a server receives a request, the server may first check if the server has affinity to the requester. If so, the server services the request. If not, the server may check to see if the request is part of an existing connection. If not, it drops the request. Otherwise, it may check an exception list, query other hosts, and perform other actions as described previously to determine whether it is to service the request.

As mentioned previously, a server may update an exception list (which may simply be part of the affinity data structure) when the server has the load quanta to which a request maps but another server has affinity to the requester. This exception list may be used to forego asking other servers if they have affinity to the requester. If a server having the load quanta to which a request maps has an exception list that indicates that the requester has affinity to another server, the server does not need to query the other servers. Instead, the server can just drop the packet and let the server that has affinity to the requester service the request.

Unfortunately, the server having affinity to the requester may become inoperable, go off-line, or fail. To counter this, in the exception list there may be a field that may be used to age affinity entries. For example, each server may maintain some information about the other servers' affinities. For example, when a server having the load quanta to which a request is mapped queries and finds out that another server has affinity to the requester, the server having the load quanta may update a data structure that indicates that the other server has affinity to the requester. As another example, if a server not having the load quanta to which a request is mapped and not having affinity to the requester sees a request from the requester, the server may update an affinity data structure (e.g., an exception list) that indicates that the requester has affinity with one of the other servers.

If no communication from a requester has been received for a period of time, the affinity entry for the requester may be deleted or marked as invalid. If, on the other hand, a communication from that requester is received (e.g., through packet flooding) on a server that does not have affinity to the requester, the timeout period may be reset.

To avoid issues with clock skew, an affinity entry may be deleted at some time before or after the timeout period expires. An affinity entry may be deleted before the timeout period expires, for example, if it is desired to have a server service a requester at the risk of breaking an already existing affinity connection. An affinity entry may be deleted after the timeout period expires, for example, if it is desired to not risk breaking an already existing affinity connection with the possibility of a requester not being able to have a request accepted by any server for a period of time.

In addition, another entity may instruct a server to flush one or more of its affinity entries. This other entity may have additional information about an affinity that the server does not have, for example. For example, the server may no longer be functioning properly or may need to be maintained and may need to be taken off-line. A server may also invalidate one or more entries of its own affinity data structure if the server determines or suspects that it has lost packets corresponding to the entries.

As another example, a server that has affinity with a requester or another device may proactively send a message to a server that has the load quanta associated with the requester to tell the server that has the load quanta to delete or invalidate its affinity entry for the requester. This may be done, for example, if the server is no longer going to service requests for the requester. The above may also be used to avoid packet snooping overhead to update time to live for exception list entries, for example.

On each server, a data structure (e.g., a bitmap, list, or the like) may be maintained that indicates whether the server has affinity with at least one requester within each set of requesters indicated by the data structure. For example, a network address may be passed through a function that returns a number between 1 and X, where X is selectable. In one embodiment, each time the server services a request and gains affinity to the requester, the server may update the portion of the data structure corresponding to the requestor's address. In another embodiment, periodically, the server may update this data structure from the server's affinity data structure. For example, the server may set one of the bits to a 1 where the bit corresponds to a portion of the source network address space that maps to the bit. When the server no longer has affinity for any client corresponding to a particular bit, the bit may be cleared.

Periodically (e.g., through heartbeat communications or otherwise,), these data structures may be exchanged among the servers of a cluster. Each server may then combine the data structure (e.g., through a logical OR where a 1 represents that a server has affinity). Then, a server having a load quanta for a request may use the combined data structure to determine whether the server needs to ask other servers for affinity for a particular requester. The server may do this by applying the function to the requestor's address and examining the data structure to see if it indicates that there is affinity for at least one requester represented by the portion of the data structure.

For example, if a bit corresponding to the requester address is 0, the server knows that no other server has affinity to the requester. If the bit is 1, however, it does not necessarily mean that another server has affinity to the particular requester. It means that another server has affinity to a client within the portion of the network address space and that the server having the quanta mapping to the request needs to query the other servers to determine if any of them has affinity to the particular requester.

In one embodiment, affinity information may be sent to other servers when cluster membership changes. In one embodiment, just that portion of the affinity information that applies to other servers may be forwarded. For example, a member having affinity information about a load quanta may send this affinity information to one or more servers that have been assigned the load quanta in connection with the membership change. In another embodiment, more or all of the affinity information may be forwarded. After a member has sent affinity information about a load quanta, the member may delete unneeded affinity information. Unneeded affinity information may include any affinity information for requesters not assigned to the member's load quanta, for example. In one embodiment, the exchange of affinity information described in this paragraph may occur only in connection with cluster membership changes. In another embodiment, this information may occur at other times.

In one embodiment, a dirty affinity bitmap may be maintained on each server for requesters that map to a load quanta assigned to the server. The dirty affinity bitmap may indicate whether any other server has affinity to a requester address that maps to a particular bit of the bitmap. If the bit is zero, a server having the load quanta assigned to the requester can immediately accept a request from the requester as it is assured that no other server has affinity to the requester. This bitmap may be aged using the various mechanism described previously. This dirty bitmap may be shared during cluster membership changes.

Figure 6:
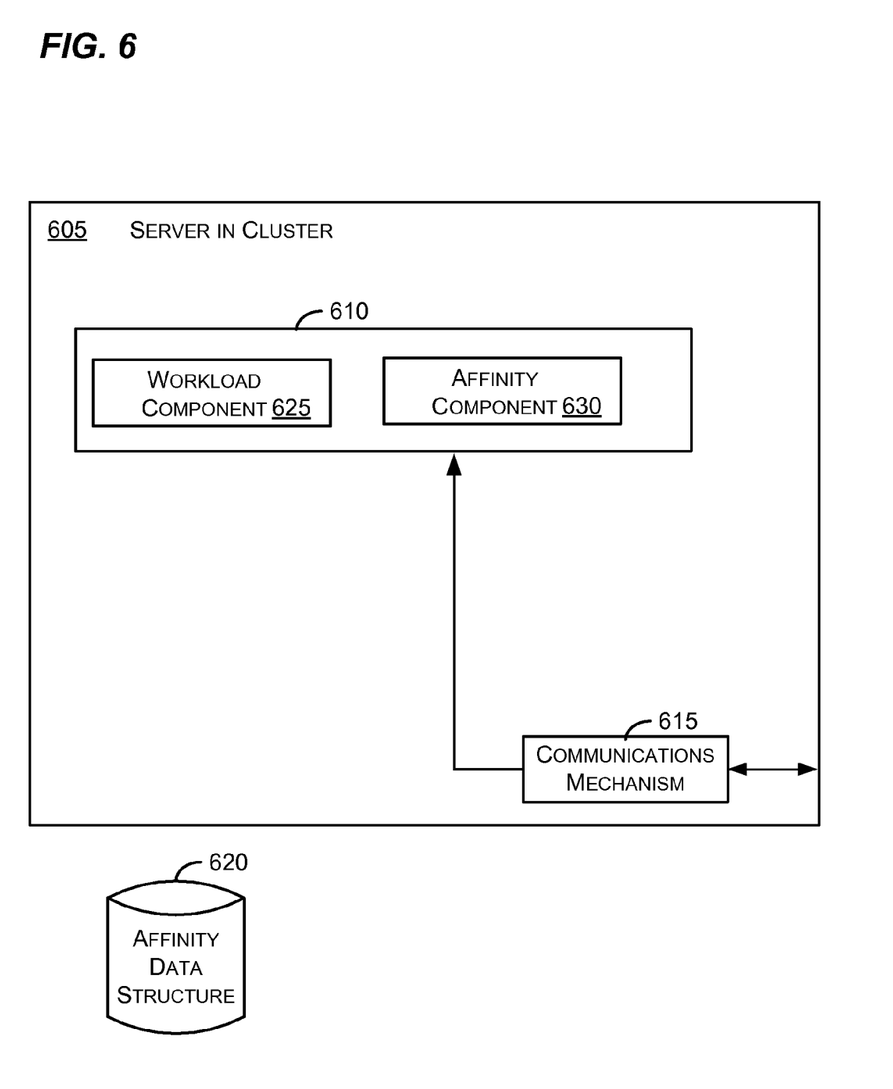
FIG. 6 is a block diagram illustrating various components associated with a server of a cluster in accordance with aspects of the subject matter described herein.

FIG. 6 is a block diagram illustrating various components associated with a server of a cluster in accordance with aspects of the subject matter described herein. The components illustrated in FIG. 6 are exemplary and are not meant to be all-inclusive of components that may be needed or included in a fully functioning system. In other embodiments, the components or functions described in conjunction with FIG. 6 may be included in other components or placed in subcomponents without departing from the spirit or scope of aspects of the subject matter described herein.

Turning to FIG. 6, a server 605 may include client affinity components 610 and a communications mechanism 615. The client affinity components 610 may include a workload component 625 and an affinity component 630. The client affinity components 610 correspond to the client affinity components 240-243 of FIG. 2.

The communications mechanism 615 allows the content server 605 to communicate with other servers in the cluster as well as to receive and respond to requests from nodes. The communications mechanism 615 may be a network interface or adapter 170, modem 172, or any other mechanism for establishing communications as described in conjunction with FIG. 1.

The store 620 may include an affinity data structure (which may include an exception list) that has been described previously. The affinity component 630 may use the affinity data structure to determine if any servers within the cluster are known to have affinity to a particular requester. The store 620 may be stored on or external to the server 605 without departing from the spirit or scope of aspects of the subject matter described herein.

The workload component 625 may determine whether a requester has been assigned to the load quanta of the server 605. The workload component 625 may do this using the techniques described previously.

As can be seen from the foregoing detailed description, aspects have been described related to client affinity in distributed load balancing systems. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having computer-executable instructions, which when executed perform actions, comprising:
   receiving a request, from a requestor, at a first server of a cluster, the cluster including a plurality of servers, each server of the cluster receiving the request, each server in the cluster maintaining an affinity table;
   the first server consulting its affinity table an affinity data structure to determine if the first server has affinity to the requestor;
   if the first server has affinity, responding to the request; and
   if the first server does not have affinity, determining whether a second server has affinity to the requestor, wherein determining whether a second server has affinity to the requestor comprises querying other servers in the cluster to ask if any of the other servers has affinity with the requestor, and further comprising:
      if any of the other servers has affinity, refraining from responding to the request, and
      if none of the other servers has affinity, responding to the request.

2. The computer storage medium of claim 1, further comprising sending the request to each server of the cluster.

3. The computer storage medium of claim 1, wherein a server has affinity to the requestor if the server has previously responded to the requestor within a selectable period of time.

4. The computer storage medium of claim 1, wherein a server has affinity with the requestor if the server has previously responded to a source address within the request within a selectable period of time.

5. The computer storage medium of claim 1, wherein determining whether a second server has affinity to the requestor comprises querying other servers in the cluster when the request is a start of a connection but not when the request is after the start of the connection.

6. The computer storage medium of claim 1, further comprising periodically distributing information among the servers of the cluster, the information indicating whether each server has affinity with any requestor within a set of addresses.

7. The computer storage medium of claim 6, wherein determining whether a second server has affinity to the requestor comprises consulting the information to determine whether to query other servers within the cluster for affinity information.

8. The computer storage medium of claim 1, wherein the affinity table comprises entries, each entry corresponding to a requestor and including information corresponding to a last time a communication was received from the entry's corresponding requestor.

9. The computer storage medium of claim 8, further comprising deleting an entry if the last time a communication was received is further away than a period of time.

10. The computer storage medium of claim 1, wherein determining whether a second server has affinity to the requestor comprises the second server sending a message to the first server if the second server has affinity and the first server has been assigned to service requests from requestors having source addresses including a source address of the requestor.

11. A method implemented at least in part by a computer, the method comprising:
    maintaining an affinity data structure by each server that is part of a plurality of servers that participate in responding to requests, the affinity data structure comprising one or more entries, each entry indicating whether a server has affinity with a requestor;
    receiving a request from a requestor;
    sending the request to the plurality of servers; and
    responding to the request by a particular server depending at least in part on whether the affinity data structure maintained by the particular server includes an entry that indicates that the particular server has affinity with the requestor of the request, and, determining whether other servers have affinity by querying the other servers to ask if any of the other servers has affinity with the requestor, and further comprising:
       if any of the other servers has affinity, refraining from responding to the request, and
       if none of the other servers has affinity, responding to the request.

12. The method of claim 11, wherein maintaining an affinity data structure by each server comprises updating the affinity data structure in conjunction with a start of a new connection.

13. The method of claim 12, wherein maintaining an affinity data structure by each server comprises receiving information from other servers that indicates requestors having affinity to the other servers that map to a workload assigned to the particular server.

14. The method of claim 11, further comprising sending at least a portion of the affinity data structure to one or more of the other servers in response to change in membership in a cluster to which the servers belong or redistribution in workload to the servers.

15. The method of claim 11, further comprising informing one of the servers that the particular server no longer has affinity with a requestor, the one of the servers having an assigned workload that includes the requestor.

16. The method of claim 11, wherein responding to the request by a particular server depending at least in part on whether the affinity data structure maintained by the particular server includes an entry that indicates that the particular server has affinity with the requestor of the request comprises not responding to the request if the affinity data structure indicates that another server has affinity to the requestor.

17. In a computing environment, an apparatus, comprising:
    a communications mechanism operable to receive a request from a requestor;
    a workload component operable to determine whether the requestor has been assigned to a workload of a server operating on the apparatus; and
    an affinity component operable to determine whether the requestor has affinity to any server of a plurality of servers that include the server, the servers configured to each receive each request from any requestor and to each determine whether to respond to the request, wherein the affinity component determines whether other servers have affinity by querying the other servers when the workload component determines that the requestor has been assigned to the server and affinity information on the server indicates that no server has affinity to the requestor, and further comprising:
if any of the other servers has affinity, refraining from responding to the request, and
if none of the other servers has affinity, responding to the request.

18. The apparatus of claim 17, wherein the affinity component maintains an affinity data structure that indicates requestors for which the server has affinity and requestors for which other servers have affinity, wherein each server of the plurality of servers maintains an affinity data structure.

* * * * *